(12) United States Patent
Mehta et al.

(10) Patent No.: US 12,340,182 B2
(45) Date of Patent: Jun. 24, 2025

(54) NATURAL LANGUAGE PROCESSING FOR CATEGORIZING SEQUENCES OF TEXT DATA

(71) Applicant: AMERICAN EXPRESS TRAVEL RELATED SERVICES COMPANY, INC., New York, NY (US)

(72) Inventors: Jugalkumar Prafulbhai Mehta, Bangalore (IN); Manish Gupta, Bangalore (IN); Padmavathi Mulagala, Ravipadu (IN)

(73) Assignee: AMERICAN EXPRESS (INDIA) PRIVATE LIMITED, New Delhi (IN)

( * ) Notice: Subject to any disclaimer, the term of this patent is extended or adjusted under 35 U.S.C. 154(b) by 332 days.

(21) Appl. No.: 17/707,110

(22) Filed: Mar. 29, 2022

(65) Prior Publication Data

US 2022/0358296 A1 Nov. 10, 2022

(30) Foreign Application Priority Data

Apr. 1, 2021 (IN) .............................. 202111015679

(51) Int. Cl.
  *G06F 40/40* (2020.01)
  *G06F 40/232* (2020.01)
  (Continued)

(52) U.S. Cl.
  CPC ............ *G06F 40/40* (2020.01); *G06F 40/232* (2020.01); *G06V 30/412* (2022.01); *G06V 30/418* (2022.01)

(58) Field of Classification Search
  None
  See application file for complete search history.

(56) References Cited

U.S. PATENT DOCUMENTS

2018/0300315 A1* 10/2018 Leal ...................... G06F 40/268
2020/0005032 A1* 1/2020 Freed .................... G06Q 10/10
(Continued)

OTHER PUBLICATIONS

International Search Report and Written Opinion of the International Searching Authority directed to related International Patent Application No. PCT/IB22/52908, mailed Jun. 29, 2022; 19 pages.
(Continued)

*Primary Examiner* — Antim G Shah
(74) *Attorney, Agent, or Firm* — Sterne, Kessler, Goldstein & Fox P.L.L.C.

(57) ABSTRACT

Disclosed herein are system, method, and computer program product embodiments for categorizing sequences of text extracted from documents using natural language processing. In some embodiments, a categorization system may receive a first document file in a machine readable format. The categorization system may analyze a sequence of text from the first document file and identify a numeric text string in the sequence. The categorization system may also identify text data in the sequence matching text data from a second document file. The categorization system may remove the numeric text string and the matching data from the sequence to generate a trimmed version of the sequence. The categorization system may then apply a vectorization model to the trimmed version of the sequence as well as a trained deep learning model to the vector version to identify a corresponding category for the sequence of text.

18 Claims, 10 Drawing Sheets

(51) Int. Cl.
*G06V 30/412* (2022.01)
*G06V 30/418* (2022.01)

(56) References Cited

U.S. PATENT DOCUMENTS

| | | | |
|---|---|---|---|
| 2020/0233857 A1* | 7/2020 | Fehling | G06Q 10/06315 |
| 2020/0311414 A1* | 10/2020 | Enuka | G06F 16/353 |
| 2021/0034707 A1* | 2/2021 | Podgorny | G06F 40/30 |
| 2021/0149993 A1* | 5/2021 | Torres | G06N 3/045 |

OTHER PUBLICATIONS

European Search Report and Opinion directed to European Patent Application No. 22779278.5, mailed Mar. 31, 2025; 9 pages.

* cited by examiner

200A

| | | ACCOUNT | 124588402 |
|---|---|---|---|
| THE COMPANY, LLC | | Statement Period | 6-Sept-2014 to 6-Oct-2014 |
| DBA Company 2 | | | |

210

| CHECKING ACTIVITY | | | | |
|---|---|---|---|---|

215

| Date | Description | Debits | Credits | Balance |
|---|---|---|---|---|
| 09/12 | CHECK NO. 11263 | 522.42 | | 11,461.12 |
| 09/12 | CHECK NO. 11259 | 1,000.25 | | 10,460.87 |
| 09/15 | Electronic Credit: American Express DES: Settlement ID:23429879 SEP15 | | 622.50 | 11,083.37 |
| 09/15 | ACH Debit NYS TAX & FINANC SALES | 958.50 | | 10,124.87 |
| 09/17 | PAYROLL ABC TRUCKING LLC Direct | | 1,547.50 | 11,672.37 |
| 09/18 | BUSINESS MARKETPLACE | | 2,600.98 | 14,273.35 |
| 09/25 | B2B ACH Mull LOANS PAYMENT 6123 | 1,411.50 | | 12,861.85 |
| 09/27 | American Express DES:ACH PMT M1221 | 12,917.50 | | -55.65 |
| 09/29 | INSUFFICIENT FUNDS FEE – FPL DIR. | 34.00 | | -89.65 |
| 10/01 | Card Purchase Return 05/04 Biz Deliv 555-232-9000 | | 1,817.12 | 1,727.47 |
| 10/02 | Online Transfer From R2 Business Checking xxxxxxx8284 Ref #ber5234Qd9W3 on 10/02/14 | | 9,900.00 | 11,627.47 |

| Transaction Description | Type | Date | Amount | Categorization |
|---|---|---|---|---|
| CHECK NO. 11263 | Debit | 9/12 | $522.42 | Withdrawal |
| CHECK NO. 11259 | Debit | 9/12 | $1,000.25 | Withdrawal |
| ACH Debit NYS TAX & FINANC SALES | Debit | 9/15 | $958.50 | Taxes |
| B2B ACH Mull LOANS PAYMENT 6123 | Debit | 9/25 | $1,411.50 | Loan Payment |
| American Express DES:ACH PMT M1221 | Debit | 9/27 | $12,917.50 | Credit Card Payment |
| INSUFFICIENT FUNDS FEE – FPL DIR. | Debit | 9/29 | $34.00 | NSF |

FIG. 2C

| Bank Name | Account Number | Account Holder Name | Start Date | End Date |
|---|---|---|---|---|
| Bank A | 2038023 | R2 Business | 6-Sept-2014 | 6-Oct-2014 |
| Bank B | 1818277 | R2 Business | 6-Sept-2014 | 6-Oct-2014 |
| Bank B | 1818284 | R2 Business | 6-Sept-2014 | 6-Oct-2014 |

FIG. 2D

| Account Number | Transaction Description | Type | Date | Amount | Categorization |
|---|---|---|---|---|---|
| 1818277 | Online Transfer From R2 Business Checking xxxxxx8284 Ref #ber5234Qd9W3 on 10/02/14 | Credit | 10/02 | $9,900.00 | Internal Transfer |
| 1818284 | Online Transfer to R2 Business Checking xxxxxx8277 Ref #ber5234Qd9W3 on 10/02/14 | Debit | 10/02 | $9,900.00 | Internal Transfer |

FIG. 2E

| Account Number | Transaction Description | Type | Date | Amount | Categorization |
|---|---|---|---|---|---|
| 1818277 | Online Transfer From R2 Business Checking xxxxxx8284 Ref #3m9r9988Wmje3 on 10/06/14 | Credit | 10/06 | $8,500.00 | Internal Transfer |
| 1818284 | Online Transfer to R2 Business Checking xxxxxx8277 Ref #3m9r9988Wmje3 on 10/06/14 | Debit | 10/06 | $8,500.00 | Internal Transfer |

FIG. 2F

NATURAL LANGUAGE PROCESSING FOR CATEGORIZING SEQUENCES OF TEXT DATA

CROSS-REFERENCE TO RELATED APPLICATIONS

This application claims priority to Indian Patent Application No. 202111015679 filed on Apr. 1, 2021, which is incorporated by reference herein in its entirety.

BACKGROUND

Field

This field is generally related to a natural language processing system configured to categorize sequences of text.

Related Art

Computer algorithms are often used to make decisions based on content contained in documents. For example, computer algorithms may be used to compute statistics based on data stored in spreadsheets. In another example, computer algorithms may be used to help determine eligibility for loans based on supporting documentation, such as back statements, offered by a loan applicant.

One issue that arises, however, occurs when computer algorithms are tasked with analyzing document data that include extraneous information not relevant to the programmed task. Further, the document data may contain errors or misspellings that may lead to inaccurate analyses. This may occur when analyzing image files or scanned versions of physical documents. Content from these image files may not be flawlessly extracted. Similarly, groupings of text may not be flawlessly extracted. While the format of the text (e.g., tabular rows and columns) may provide additional details relevant for computer analysis, computer algorithms may face difficulties identifying these groupings of text and properly categorizing the text for analysis.

In view of potentially inaccurate categorizations, downstream systems applying computer algorithms to the text may produce erroneous results.

BRIEF SUMMARY

Disclosed herein are system, apparatus, device, method and/or computer program product embodiments, and/or combinations and sub-combinations thereof, for a categorization system that categorizes sequences of text extracted from documents. The categorization system may use natural language processing with machine learning to identify and/or categorize sequences of text. Downstream processing systems may use these categorizations to perform further analyses on the text data. Using the processes described below, the categorization system may more accurately analyze and categorize the sequences of text. For example, the categorization system may identify misspellings and/or errors in textual documents. The categorization system may still be able to identify accurate categories even when the text data includes errors. By more accurately categorizing text data, downstream processing systems may have increased accuracy in analyzing the text data. Further, the categorization system may be language agnostic and/or may apply to text in different languages. This may provide additional flexibility and robustness.

In some embodiments, the categorization system may categorize sequences of text by using a text analysis process, a vectorization process, and/or a deep learning model. For example, the categorization system may receive a document. The document may be pre-processed and/or converted to a machine readable format. The categorization system may identify sequences of text based on this formatting.

After identifying the sequences of text, the categorization system may perform a text analysis process. This text analysis process may identify information useful for categorizing sequences of text. In some embodiments, the text analysis may remove unique strings of numbers and characters. For example, a string of numbers and characters may be a reference identification number or serial number. Because this unique information may not be useful for identifying a category for a sequence of text, the categorization system may remove this information when performing the categorization.

Similarly, some generic text data may not be useful for categorizing the sequence of text. For example, when analyzing text data related to transactions, the transactions may include company names. In this context, however, company names may not indicate what type of transaction is occurring. For example, a company name may not provide detail on whether the transaction is a loan payment, a credit card payment, money received from the designated company, a transaction to or from that company, a refund, or other type of transaction. In this case, the company name may not be useful for categorizing the sequence of text. The categorization system may remove this text from the sequence of text.

To determine the generic text data, the categorization system may use a crowd learning process. This process may include comparing text data from the text sequences to text data from other documents. For example, if the text sequences describe transactions, the text data from the sequences may be compared to other documents including transaction information. Based on this comparison, the categorization system may identify generic text data, such as a company name and/or other common text data. After identifying matching data, the categorization system may remove the matching data from the text sequences. Removing this generic text data may help the categorization system because the generic text data may not help with categorizing the text sequence. In some embodiments, the categorization system may use a dictionary to preserve some common words which have been designated as relevant to identifying the category.

After applying the text analysis process, the categorization system may generate a trimmed version of a sequence of text. This trimmed version may remove the unique alphanumeric reference or serial identification information and/or the generic text data matching the text data identified in other documents. The remaining text data in the trimmed version of the text sequence may be used by the categorization system to categorize the sequence of data.

In this manner, the categorization system may remove data that is too unique and/or too generic to be helpful with categorizing the sequence of text data. This process may yield higher accuracy when categorizing the sequence of text. For example, removing this data may provide additional accuracy when the text is analyzed by a machine learning algorithm to identify a category and/or when the identified category is applied in a downstream analysis.

Using the trimmed version of the sequence of text, the categorization system may apply a vectorization model to generate a vector version of the trimmed version of the sequence. This vectorization model may convert the trimmed version of the text to a vector. This vector may address misspellings and/or errors in the text as the remaining characters may be converted. The vector representation of the remaining text may be more resilient to errors as similar words may yield similar vectors when converted. This may occur even if some words are misspelled, truncated, and/or altered from the full correct spelling.

After generating a vector version of the text data, the categorization system may apply a deep learning model artificial intelligence to the vector version to categorize the sequence of text. The deep learning model may have been previously trained with labeled training data to assign categories to vector representations of text. Based on this training, the deep learning model may assign a category to the sequence of text. For example, the deep learning model may select a category from a set of predefined categories. In some embodiments, an "other" category may be specified in the predefined set for sequences of text not belonging to the other categories of the set. With the assignment of a category, the categorization system may package the category with the sequence of text. The categorization system may then transmit this package to a downstream processing system to perform further analysis on the sequence of text and the category. In some embodiments, the downstream processing system may be implemented in the same system as the categorization system. In some embodiments, the downstream processing system may be implemented as a system external to the categorization system. In view of the increased categorization accuracy, the downstream processing system may perform more accurate analyses of the text.

While one sequence of text may be described in this description, the same processes may be applied to multiple sequences of text. For example, the categorization system may analyze documents organized into rows and/or columns. The categorization system may identify sequences of texts within the rows and/or columns. The categorization system may then apply the same text analysis, vectorization, and/or deep learning techniques to the multiple sequences to categorize multiple sequences of text. In some embodiments, the categorization system may analyze the sequences sequentially and/or sequentially assign categories to the sequences. In some embodiments, the categorization system may process multiple sequences in parallel. For example, the categorization system may apply the text analysis to multiple sequences of text. The categorization system may then transform the multiple sequences into vectors and apply the deep learning model to the multiple sequences. In some embodiments, the categorization system may use a combination of serial and/or parallel processes for assigning categories.

As previously explained, these processes may be language agnostic and/or applicable to different languages. The categorization system may apply the text analysis, vectorization, and/or deep learning processes to documents in different languages. These processes may similarly yield more accurate categorization results in the different languages.

BRIEF DESCRIPTION OF THE DRAWINGS

The accompanying drawings are incorporated herein and form a part of the specification.

FIG. 2A depicts a block diagram of an example document, according to some embodiments.

FIG. 2C depicts a block diagram of example text sequences grouped into a debit type, according to some embodiments.

FIG. 2D depicts a block diagram of example of documents with corresponding account numbers, according to some embodiments.

FIG. 2E depicts a block diagram of a first set of text sequences indicating an internal transfer category, according to some embodiments.

FIG. 2F depicts a block diagram of a second set of text sequences indicating an internal transfer category, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for categorizing sequences of text data using natural language processing. Various embodiments of these features will now be discussed with respect to the corresponding figures.

Figure 1A:
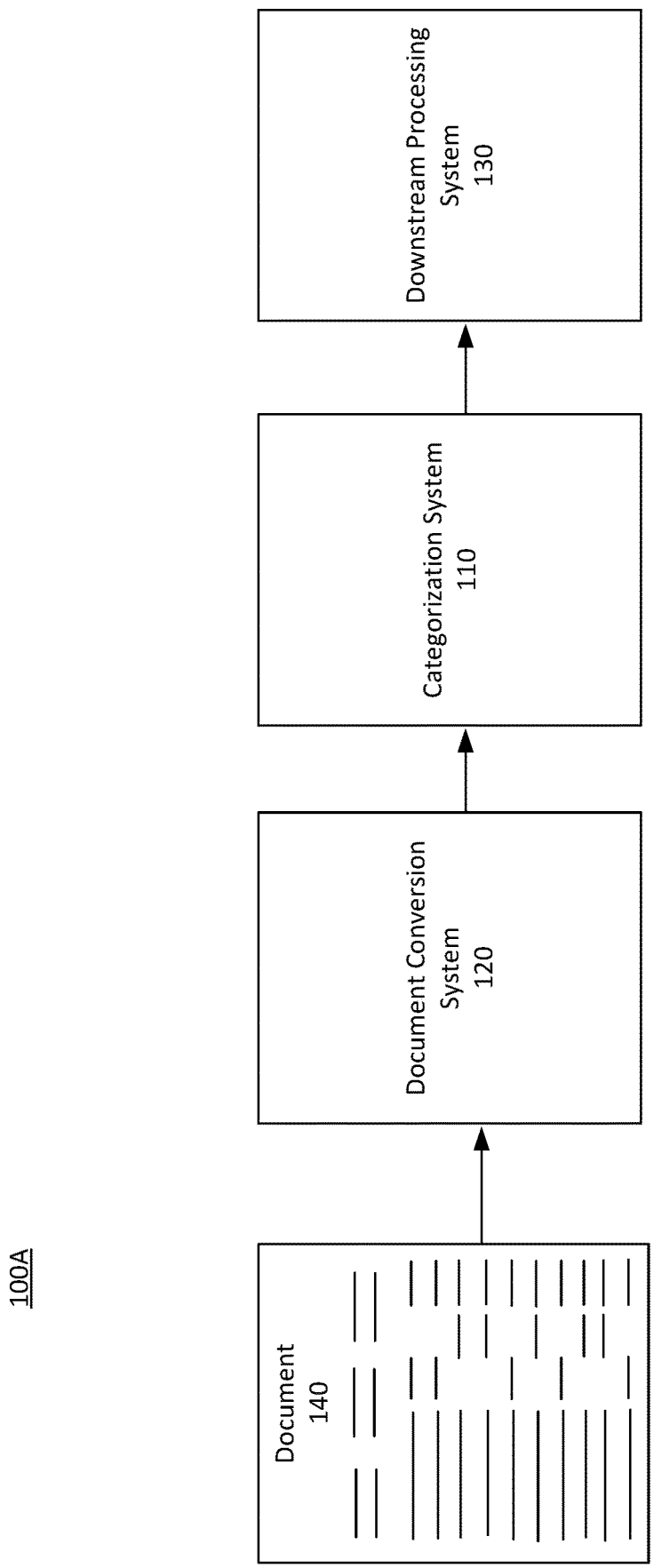
FIG. 1A depicts a block diagram of an example document categorization environment, according to some embodiments.

FIG. 1A depicts a block diagram of a document categorization environment 100, according to some embodiments. Document categorization environment 100 may include categorization system 110, document conversion system 120, downstream processing system 130, and document 140.

Document 140 be an image of a document and/or other type of data file having text characters that may be identified. Document 140 may include handwritten and/or typewritten text. Document 140 may be a scanned document, a PDF document, a photograph, and/or an image of a document. In some embodiments, document 140 may be a data file containing formatted text such as, for example, HTML, Word text, plain text, formatted text, and/or other text data files. Document 140 may include characters and/or groupings of characters. The characters may be arranged into sequences of text. For example, the characters may be grouped into words or sequences of words. In some embodiments, the characters may be grouped in a tabular format with rows and/or columns. As will be further described below, in some embodiments, document 140 may be a bank statement. The bank statement may be a commercial bank statement corresponding to a company. In some embodiments, the bank statement may be a personal bank statement for a consumer.

Document conversion system 120 may identify text, characters, formatting, and/or other labels of text data from document 140. In some embodiments, document conversion system 120 may apply optical character recognition techniques and/or use computer algorithms to identify characters of document 140. Document conversion system 120 may identify labels corresponding to different groupings of text or characters. For example, if document 140 is tabulated, document conversion system may identify text data organized into rows and/or columns. Document conversion system 120 may label this text data according to the row and/or column labels.

In an example embodiment, document conversion system 120 may receive an image file of a commercial bank statement. An example of such a bank statement is discussed further with reference to FIG. 2A. The bank statement may include rows of transaction information. The columns may indicate different fields and/or data corresponding to each row of a transaction. For example, the columns may include a date field, description field, fields indicating a debit, credit, withdrawal, and/or deposit, and/or a balance field. Document conversion system 120 may identify these fields and organize the data from the transaction rows into these fields. Document conversion system 120 may label the text data from each row to match one or more of these fields based on the organization and/or layout of document 140. For example, if document 140 includes two columns for debits and credits, document conversion system 120 may assign debit or credit to the transaction based on whether text data appears in a particular column. If a transaction has text data under the debits column, document conversion system 120 may label the transaction as a debit. Similarly, document conversion system 120 may use the absence of text data to categorize the transaction. For example, if the transaction does not have text under the credits column, document conversion system 120 may label the transaction as a debit. This process may be used to label the text characters and/or text sequences of document 140.

In some embodiments, document conversion system 120 may generate a table of labeled data including the identified text data organized into rows and/or columns. For example, document conversion system 120 may generate a spreadsheet or a comma-separated values file. For example, the formatting may identify sequences of text and/or words and group the text together based on the structure of document 140. Example embodiments of these organizations are further described with reference to FIGS. 2B and 2C. This formatting may extract the text data and convert document 140 into a machine readable format. In some embodiments, document conversion system 120 may overlay identified text characters and/or groupings on document 140. This may produce an enriched version of document 140 with identified and/or machine readable text.

After generating a machine readable version of document 140, document conversion system 120 may pass and/or transmit the machine readable version to categorization system 110. In some embodiments, categorization system 110 may be implemented using the same hardware and/or software components as document conversion system 120. In some embodiments, document conversion system 120 may be implemented as a system external to categorization system 110. Computer system 400 as described with reference to FIG. 4 may be used to implement document conversion system 120 and/or categorization system 110. As will be further described below, downstream processing system 130 may be implemented using the same hardware and/or software components as document conversion system 120 and/or categorization system 110. In some embodiments, downstream processing system 130 may be implemented as a system external to categorization system 110 and/or document conversion system 120. Computer system 400 as described with reference to FIG. 4 may be used to implement downstream processing system 130.

Returning to categorization system 110, categorization system 110 may receive the machine readable format of document 140 from document conversion system 120. Categorization system 110 may then categorize the sequences of text from document 140 using text analysis, vectorization, and/or deep learning processes. This operation will be further described with reference to FIGS. 1B and 3. Upon determining a category for the sequences of text, categorization system 110 may add this information to the machine readable format of document 140. For example, as will be discussed with reference to FIGS. 2B and 2C, categorization system 110 may populate a column of information for a categorization field. In some embodiments, categorization system 110 may provide the categorizations separately from document 140. In either case, categorization system 110 may provide document 140, the machine readable format of document 140, and/or the determined categories for each sequence of text to downstream processing system 130.

Downstream processing system 130 may use the received categorization data to perform further analysis on the text included in document 140. For example, document 140 may be a commercial bank statement corresponding to a company, and downstream processing system 130 may be programmed to analyze risk related the company. This may occur, for example, when the company is applying for a loan and provides financial information with its loan application. The categories provided by categorization system 110 may categorize the transactions of the commercial bank statement to aid with determining risk. For example, some categories may include money received or credited to the account. Downstream processing system 130 may increase favorability for loan approval upon detecting this category and/or a recurrence of this category. Similarly, another category may represent an insufficient funds fee or an overdraft charge. Downstream processing system 130 may decrease favorability for loan approval upon detecting this category and/or a recurrence of this category. In this manner, downstream processing system 130 may analyze the categories provided by categorization system 110 to perform further analyses on document 140. Categorization system 110 may more accurately provide these categories for use by downstream processing system 130 to make banking decisions.

In some embodiments, downstream processing system 130 may apply bank statement machine learning and/or make a credit decision based on the categories identified by categorization system 110. To illustrate a process for this decision, document 140 may be a raw bank statement. For example, document 140 may be a data file in a portable document format (PDF). Document conversion system 120 may receive document 140. In some embodiments, document conversion system 120 may receive user credentials. The user credentials may provide confirmation of authenticity of document 140. These credential may be received via a Yodlee® widget. Document conversion system 120 may convert document 140 into a machine readable format. In some embodiments, this may be referred to a spreading the bank statement. Categorization system 110 may then identify categories for each sequence of text in the bank statement. Categorization system 110 may then pass these categories with the sequences of text to downstream processing system 130. Downstream processing system 130 may leverage the categories with the sequences of text and/or the raw bank data to make banking decisions. In some embodiments, downstream processing system 130 may apply commercial models using the categories. For example, downstream processing system 130 may make a credit decision based on the identified categories. As further explained herein, the categorization process may yield increased accuracy and more accurately identify categories corresponding to sequences of text.

Figure 1B:
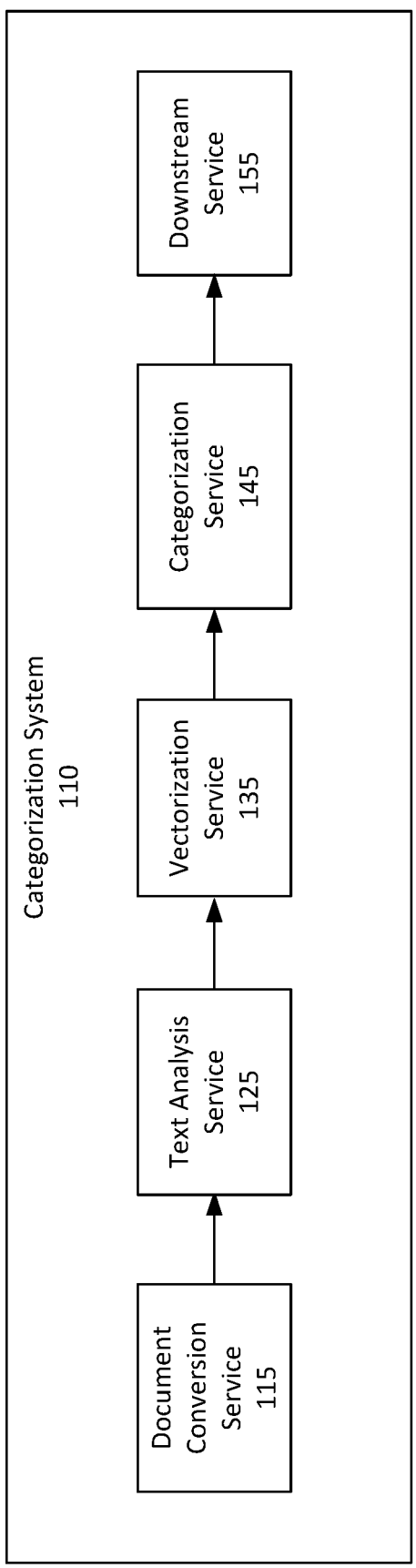
FIG. 1B depicts a block diagram of an example categorization system, according to some embodiments.

FIG. 1B depicts a block diagram of an example categorization system 110, according to some embodiments. As explained with reference to FIG. 1A, categorization system 110 may identify categories for sequences of text from document 140. To identify these categories, categorization system 110 may use document conversion service 115, text analysis service 125, vectorization service 135, categorization service 145, and/or downstream service 155. As previously explained categorization system 110 may implement these services and/or may be implemented using the hardware and/or software described with reference to FIG. 4.

Categorization system 110 may receive document 140 and/or a machine readable format of document 140 using document conversion service 115. In some embodiments, categorization system 110 may receive document 140 as an image file and may generate the machine readable format of document 140 using document conversion service 115. In some embodiments, document conversion service 115 may be communicatively coupled to document conversion system 120. Document conversion service 115 may receive a machine readable format of document 140 from document conversion system 120. In some embodiments, the machine readable format of document 140 may group text into sequences of text as previously described.

After receiving the machine readable format of document 140, categorization system 110 may apply text analysis service 125 to the sequences of text. Text analysis service 125 may identify information useful for categorizing the sequences of text. Text analysis service 125 may remove text data from text sequences that may be too specific and/or too general to aid with categorizing the sequences. For example, document 140 may be a bank statement with transactions and categorization system 110 may categorize the transactions. This categorization may be based on sequences of text in the transaction description field and/or other fields. In the transaction description field, there may be text data that is too specific and/or too general to be useful for categorizing the transaction. Text analysis service 125 may identify and/or remove this text data.

For example, text analysis service 125 may remove unique strings of numbers and characters. These strings of numbers and characters may be a reference identification number or serial number. For example, the transaction description field may include a reference identification for a particular transaction. This unique information may not be useful for identifying a category for a sequence of text because it may be too specific. For example, a reference identification may not indicate the type of transaction occurring within the sequence of text. Text analysis service 125 may remove this information to more accurately determine a category later in the process.

Similarly, some generic text data may not be useful for categorizing the sequence of text. For example, when text analysis service 125 analyzes the text data related to transactions, the transactions may include company names. The company names, however, may not indicate what type of transaction is occurring. For example, a company name may not provide detail on whether the transaction is a loan payment, a credit card payment, money received from the designated company, a transaction to or from that company, a refund, or other type of transaction. In this case, the company name may not be useful for categorizing the sequence of text. Text analysis service 125 may remove this text from the sequence of text.

In some embodiments, text analysis service 125 may use a crowd learning process to determine generic text data to be removed. Text analysis service 125 may compare text data from the text sequences to text data from other documents. For example, if the text sequences describe transactions, the text data from the sequences may be compared to other documents including transaction information. Based on this comparison, text analysis service 125 may identify generic text data, such as a company name and/or other common text data. After identifying matching data, text analysis service 125 may remove the matching data from the text sequences. Removing this generic text data may help to more accurately identify a category. For example, remove the generic text data may help to avoid noise not relevant for identifying a transaction category.

In some embodiments, text analysis service 125 may include a dictionary of words not to remove. For example, identifying words such as "transfer" or "checking" may be relevant to preserving for categorization. Although these may appear in other documents, these words may not be removed by text analysis service 125.

After removing text data that is too unique and/or too generic from a sequence of text, text analysis service 125 may generate a trimmed version of that sequence of text. This trimmed version may remove the unique alphanumeric reference or serial identification information and/or the generic text data matching the text data identified in other documents. The remaining text data in the trimmed version of the text sequence may be used to categorize the sequence of data. In this manner, the removal of data that is too unique and/or too generic to be helpful with categorizing the sequence of text data. This process may yield higher accuracy when categorizing the sequence of text. For example, removing this data may provide additional accuracy when the text is analyzed by a machine learning algorithm to identify a category and/or when the identified category is applied in a downstream analysis.

To illustrate an example embodiment of the process performed by text analysis service 125, document 140 may be a commercial bank statement. One sequence of text from document 140 may correspond to a transaction description for a transaction. The transaction description may state "Online Transfer to ABCD company Checking xxxxx8829 Ref #dOjm54nl9F2 on Aug. 14, 2018". Text analysis service 125 may remove the unique account and/or reference identification information. Text analysis service 125 may also remove the date information for also not being relevant to categorizing the transaction. In some embodiments, text analysis service 125 may identify numeric values and remove the numeric values. Text analysis service 125 may also perform a crowd learning process to identify generic data common in other documents. For example, text analysis service 125 may recognize that "ABCD" may be a unique term but may be commonly used in other transaction documents. Text analysis service 125 may search other documents using text mining and/or crowd learning techniques to identify "ABCD" as a company name. Text analysis service 125 may remove this from the sequence of text as not useful for generating the category. Based on these removals, text analysis service 125 may generate a trimmed version of the sequence of text, which may state "online transfer to company checking". This trimmed version may allow for more accurate category determinations for the sequence of text.

Using the trimmed version of the sequence of text, categorization system 110 may apply vectorization service 135 to the trimmed version of the sequence of text. Vectorization service 135 may apply a vectorization model to generate a vector version of the trimmed version of the sequence. In some embodiments, the vectorization model may be a word2vec model. The word2vec algorithm may use a neural network model to learn word associations from a training text data. Once the word2vec model is trained, the model may identify synonyms for words and/or may correct misspellings and/or errors in words. In some embodiments, word2vec may represent words in a sequence of text with a particular vector and/or numeric representation. The vectors may map words that are semantically similar together using a mathematical function. For example, applying this mathematical function to two vectors may indicate a level of semantic similarity between the words as represented by the two vectors.

Vectorization service 135 may convert the trimmed version of the text to a vector. This vector may address misspellings and/or errors in the text as the remaining characters may be converted. The vector representation of the remaining text may be more resilient to errors as similar words may yield similar vectors when converted. This may occur even if some words are misspelled, truncated, and/or altered from the full correct spelling. For example, for the word "deposit," misspellings like "oeposit", "deposit.", "deposi", "deport", or "depostt", may still yield similar vectors and therefore be analyze in a similar manner.

Vectorization service 135 may also identify synonyms as well. For example, a category of text data may reflect a transaction related to "non-sufficient funds." Words providing this indication may include "overdraft", "insufficient", "uncollected", "ucf", or "uncollhold". Vectorization service 135 may convert these words to have similar vectors. For example, word2vec may assign similar values to these words in the vector.

After generating a vector version of the text data, categorization system 110 may apply categorization service 145 to the vector version of the text. Categorization service 145 may apply a deep learning model artificial intelligence to the vector version to categorize the sequence of text.

In some embodiments, the deep learning model may learn long-term dependencies within respective cells of the vector version of the text data. For example, the deep learning model may be a recurrent neural network (RNN) and/or a long short-term memory (LSTM) model. The LSTM model may be a type of RNN that identifies long-term dependencies. To identify these long-term dependencies and to analyze data based on these dependencies, the LSTM model may use a chain of repeating neural network modules. Each neural network module may manage a cell state. Each neural network module of the LSTM model may include multiple neural network layers that manage the long-term dependencies corresponding to a cell state. For example, a neural network module may include a sigmoid layer that is a forget gate layer. This layer may determine information to keep or discard. The sigmoid layer may determine an amount of component data to allow through to the next layer. The next layer may be another sigmoid layer called an input gate layer. The input gate layer may determine which values of the cell state may be updated to track the long-term dependencies. Based on this determination, the neural network module may also include a tan h layer to generate a vector of one or more candidate values to update the cell state. With this process, the LSTM model may remove old information and/or add new information to update the cell state. The neural network module may then use another sigmoid layer to output data for the following neural network module or the output of the LSTM model. The chain of neural network modules may track different long-term dependencies based on the cell states to track different language patterns.

In some embodiments, the deep learning model may use various techniques to increase accuracy for determining a category. For example, the techniques may include peephole connections that allow gate layers to analyze cell states. In some embodiments, the deep learning model may couple forget and input gates and to decide together which information to forget and to add for updating the long-term dependencies. In some embodiments, the deep learning model may be a Gated Recurrent Unit (GRU), may use Depth Gated RNNs, may use Clockwork RNNs, and/or may be a Grid LSTM model.

By training and then applying the deep learning model, categorization service 145 may manage cell states and/or long-term dependencies to more accurately categorize sequences of text. The deep learning model may have been previously trained with labeled training data to assign categories to vector representations of text. The categories may be assigned from a predefined set of categories. In some embodiments, an "other" category may be specified in the predefined set for sequences of text not belonging to the other categories of the set. This training data may train the deep learning model to learn long-term dependencies within respective cells of vectors. After training the deep learning model, the deep learning model may be applied to categorize vector versions and/or vector representations of text into the predefined categories.

The deep learning model may be trained separately or in combination with the vectorization model with the labeled training data. The labeled training data may include sequences of text with corresponding labeled categories. To train the deep learning model and/or the vectorization model, categorization system 110 may apply vectorization service 135 to the training data to generate vectors for the sequences of text. Categorization system 110 may then apply the deep learning model of categorization service 145 to the generated vectors with corresponding labeled categories. This labeling may train the deep learning model. After training the deep learning model, categorization service 145 may identify categories for subsequent sequences of text.

After vectorization service 135 provides a vector version of a sequence of text, categorization service 145 may assign a category to the sequence of text. The deep learning model may select a category from the set of predefined categories used to train the model. In this manner, categorization service 145 may assign different categories to different sequences of text based on the trimmed and vector versions of the text sequences. As previously explained, these categories may help downstream processing system 130 perform further analyses on the sequences of text from document 140.

With the assignment of a category, categorization system 110 may use downstream service 155 to package the assigned category with the sequence of text. The categorization system may then transmit this package to downstream processing system 130 to perform further analysis on the sequence of text and the category. As previously explained, downstream processing system 130 may be implemented in the same system as categorization system 110. In some embodiments, downstream processing system 130 may be implemented as a system external to categorization system 110. In view of the increased categorization accuracy, downstream processing system 130 may perform more accurate analyses of the text.

Document 140 may include multiple sequences of text. For example, if document 140 is a commercial bank statement, the multiple sequences of text may be the transaction descriptions corresponding to each transaction. Categorization system 110 may apply the same text analysis service 125, vectorization service 135, and/or categorization service 145 to the multiple sequences to categorize multiple sequences of text. In some embodiments, categorization system 110 may assign categories to the multiple sequences on a sequence-by-sequence basis. Categorization system 110 may analyze the sequences sequentially and/or sequentially assign categories to the sequences. In some embodiments, categorization system 110 may process multiple sequences in parallel. For example, categorization system 110 may apply text analysis service 125 to multiple sequences of text. Categorization system 110 may then transform the multiple sequences into vectors using vectorization service 135. Categorization system 110 may then apply categorization service 145 and the deep learning model to the multiple sequences. In some embodiments, categorization system 110 may use a combination of serial and/or parallel processes for assigning categories.

As previously explained, categorization system 110 may be language agnostic and/or applicable to different languages. Categorization system 110 may apply text analysis service 125, vectorization service 135, and/or categorization service 145 to documents 140 in different languages. These processes may similarly yield more accurate categorization results in the different languages.

FIG. 2A depicts a block diagram of an example document 200A, according to some embodiments. Document 200A may be an example of document 140 as described with reference to FIGS. 1A and 1B. While document 200A is an example embodiment, document 140 is not limited solely to this example embodiment. In some embodiments, document 200A may be a commercial bank statement corresponding to a company. The commercial bank statement may include tabulated rows and columns corresponding to different transactions. The transactions may correspond to a company bank account. The company may have provided document 200A in an application for a loan or credit card. Categorization system 110 may analyze sequences of text from document 200A to categorize the sequences of text as explained with reference to FIGS. 1B and 3.

Document 200A may include a description field 210. Categorization system 110 may analyze the text data of the description field to generate category assignments. In some embodiments, categorization system 110 may analyze other text from other fields. For example, categorization system 110 may examine a debit and/or credit field to determine whether a transaction represents a monetary value deposited or withdrawn from the account.

Document 200A may include different types of transactions. For example, document 200A may include a withdrawal transaction 215. This may include a check payment and/or a cash withdrawal. Document 200A may include a deposit transaction 220. This may include payments received into the account. As will be further explained with reference to FIGS. 2B and 2C, categorization system 110 may categorize different types of deposits and withdrawals based on predefined transaction categories.

Document 200A may include an insufficient funds transaction 225. The insufficient funds transaction 225 may indicate an attempt to withdraw or debit funds from the account beyond the balance of the account. A bank may charge a fee for such a transaction. This fee may be recorded as insufficient funds transaction 225. Categorization system 110 may identify and/or categorize this type of transaction.

Another type of transaction may be an internal transfer transaction 230. An internal transfer transaction 230 may represent a transaction debited to or credit from an account belonging to the same entity. For example, as will be further explained with reference to FIGS. 2D, 2E, and 2F, a company may manage at least two accounts. Categorization system 110 may identify transfer transactions between the two accounts based on an analysis of corresponding documents 140. For example, document 200A may include an internal transfer transaction 230 based on a bank account corresponding to the company. Categorization system 110 may identify another bank account corresponding to the company based on another document 140. Categorization system 110 may identify matching bank account numbers in the description field of the documents. In some embodiments, categorization system 110 may identify matching dates and/or amounts to verify the transfer. Based on a comparison of the matching bank account numbers and/or other text data, categorization system 110 may identify the sequence of text corresponding to internal transfer transaction 230 as an internal transfer category.

Figure 2B:
FIG. 2B depicts a block diagram of example text sequences grouped into a credit type, according to some embodiments.

FIG. 2B depicts a block diagram of example text sequences grouped into a credit type, according to some embodiments. FIG. 2C depicts a block diagram of example text sequences grouped into a debit type, according to some embodiments. In some embodiments, the text sequences may be ordered into data tables 240, 250. This organization may be performed by document conversion system 120 after analyzing document 140. While data tables 240, 250 depict populated categorization fields 245, 255, these fields may not be populated by document conversion system 120. Rather, categorization system 110 may populate these fields after performing an analysis on the text strings in the other fields.

In some embodiments, document conversion system 120 may analyze and/or extract sequences of text from a commercial bank statement as document 140. As part of this extraction, document conversion system 120 may identify different categories of transactions such as debit transactions and credit transactions. Document conversion system 120 may generate data table 240 including the credit transactions. Similarly, document conversion system 120 may generate data table 250 include the debit transactions. In this manner, document conversion system 120 may group sequences of text with labels for organization. Categorization system 110 may use these groupings of sequences to determine categories for each sequence of text or transaction. For example, sequences of text grouped into a data table 240 for credit transactions may indicate a subset of categories related to credit transactions. Similarly, sequences of text grouped into a data table 250 for debit transactions may indicate a subset of categories related to debit transactions. Using this information, categorization system 110 may analyze the sequences of text in the transaction description and/or type fields to determine a category for each sequence of text or transaction. Categorization system 110 may then populate the categorization fields 245, 255.

In the scenario of transactions, the deep learning model may have been trained to identify categories related to transactions. As previously explained, this training may have been performed using labels with a predefined set of categories. These categories may include, for example, received settlement funding, received payroll funding, received sales funding, received refund funding, withdrawals in cash, withdrawals via check, payments via check, payments for taxes, payments for loans, payments for credit cards, and/or other types of debit or credit transactions. In some embodiments, the categories may include one or more "other" categories for transactions not matching other categories. For example, categorization system 110 may include an "other sales" category. In some embodiments, categorization system 110 may identify a non-sufficient funds ("NSF") category. This category may identify transactions that have exceeded the balance of the account. Words in the transaction description such as "overdraft", "insufficient", "uncollected", "ucf", or "uncollhold" may lead to an NSF category.

As will be further described with reference to FIGS. 2D, 2E, and 2F, categorization system 110 may identify an internal transfer category. This internal transfer may not reflect a payment received or transfer from an account. Rather, the internal transfer may represent a transaction between two accounts corresponding to the same entity. Downstream processing system 130 may use this information to more accurately categorize the financial status of an account.

FIG. 2D depicts a block diagram of example of documents with corresponding account numbers, according to some embodiments. In some embodiments, categorization system 110 may manage data table 260, which includes sequences of text indicating different bank statement documents. For example, sequence 265A may represent a first bank statement document for a company. Sequence 265B may represent a second bank statement document for that same company. Sequences 265A, 265B may include account number text data that may be identified by categorization system 110. Sequences of text from these documents will be further described with reference to FIGS. 2E and 2F.

FIG. 2E depicts a block diagram of a first set of text sequences indicating an internal transfer category, according to some embodiments. Data table 270 may reflect a transaction as seen from the perspectives of the first and second bank statements. These perspectives may be identified with the corresponding account numbers identified by categorization system 110. For example, for account number 1818277, a transaction description sequence may indicate an online transfer from an account ending in "8284". Categorization system 110 may identify this sequence when analyzing the transaction description. Categorization system 110 may also analyze the second sequence corresponding to account number 1818284 and identify an online transfer from this account to an account ending in "8277". Based on the analysis of these text strings and account numbers, categorization system 110 may identify that these descriptions are referring to the same transaction. In some embodiments, categorization system 110 may confirm this transaction using the date and/or transaction amount. After analyzing these sequences, categorization system 110 may assign an internal transfer category to both transactions to categorize the transaction. This may occur in categorization field 275.

FIG. 2F depicts a block diagram of a second set of text sequences indicating an internal transfer category, according to some embodiments. Similarly to data table 270, in data table 280, categorization system 110 may identify a transaction of funds from the account ending in 8284 to the account ending in 8277. Categorization system 110 may also assign an internal transfer category to these transactions. This may occur in categorization field 285. While some embodiments have been described with reference to identifying account numbers, categorization system 110 may also recognize internal transfers based on account names. For example, categorization system 110 may recognize transfers from different holding companies under the same umbrella company.

Figure 3:
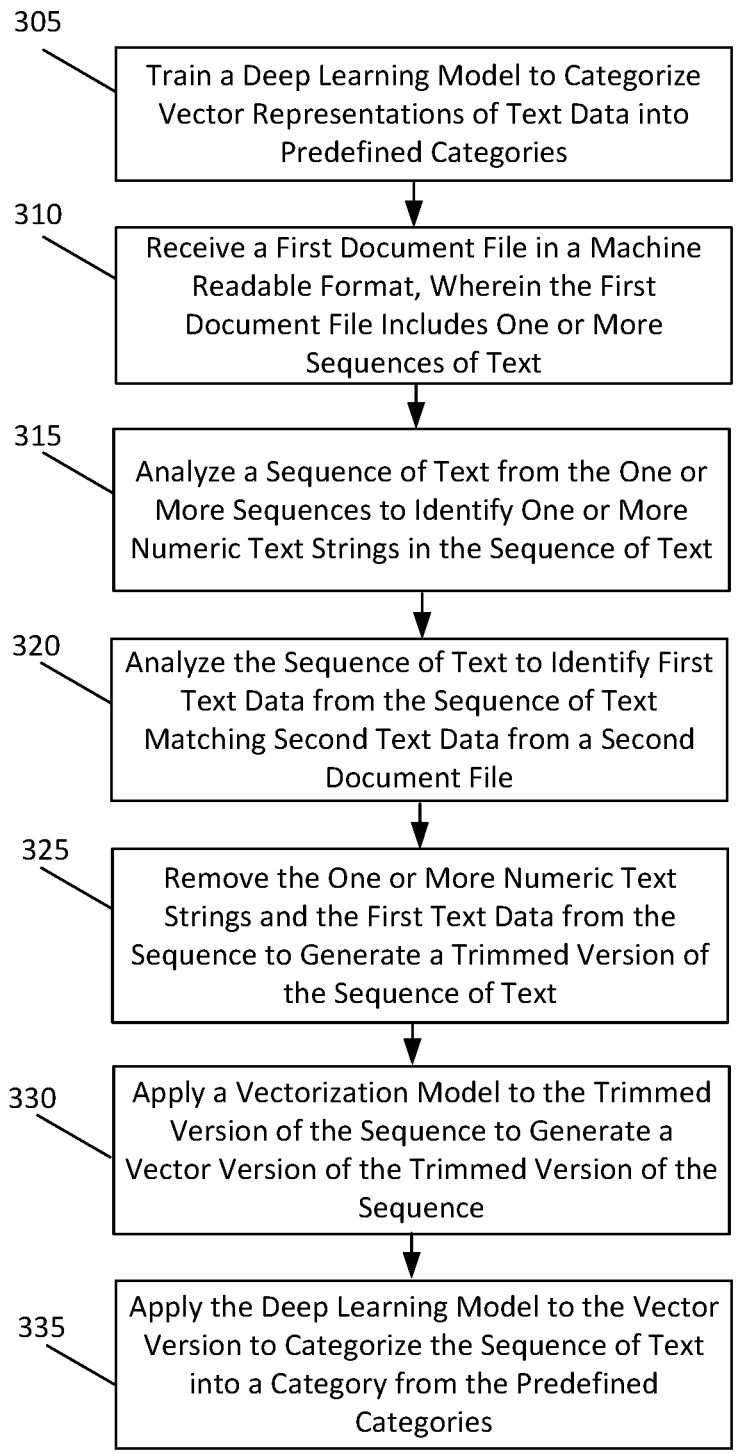
FIG. 3 depicts a flowchart illustrating a method for categorizing sequences of text from a document, according to some embodiments.

FIG. 3 depicts a flowchart illustrating a method 300 for categorizing sequences of text from a document, according to some embodiments. Method 300 shall be described with reference to FIGS. 1A and 1B; however, method 300 is not limited to that example embodiment.

In an embodiment, categorization system 110 may utilize method 300 to process document 140. Method 300 may generate categories for sequences of text from document 140. The foregoing description will describe an embodiment of the execution of method 300 with respect to categorization system 110. While method 300 is described with reference to categorization system 110, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 305, categorization system 110 may train a deep learning model to categorize vector representations of text data into predefined categories. As previously explained with reference to FIG. 1B, categorization system 110 may use labeled training data to train a deep learning model. The labeled training data may include predefined categories corresponding to sequences of text. For example, for documents that are commercial bank statements, the sequences of text may be transaction descriptions. The corresponding labeled categories in the training data may be categories corresponding to the transaction descriptions. In some embodiments, the labeled training data may correlate vector versions of the sequences of text to the labeled category. In some embodiments, the labeled training data may be passed through a vectorization model and the deep learning model to train the deep learning model to categorize vector representations. By training the deep learning model in this manner, the deep learning model may categorize sequences of text in subsequent documents 140.

At 310, categorization system 110 may receive a first document file in a machine readable format, wherein the first document file includes one or more sequences of text. As explained with reference to document conversion service 115, categorization system 110 may receive a machine readable format of document 140 from document conversion system 120. In some embodiments, document conversion system 120 may be implanted using common hardware and/or software components with categorization system 110. In some embodiments, document conversion system 120 may be a system external to categorization system 110. Document conversion system 120 may convert document 140 into a machine readable format to by processed by categorization system 110.

At 315, categorization system 110 may analyze a sequence of text from the one or more sequences to identify one or more numeric text strings in the sequence of text. As explained with reference to text analysis service 125, categorization system 110 may identify numeric text strings that may not be relevant for categorizing the sequences of text. For example, these numeric text strings may be reference identification information and/or unique account numbers. In some embodiments, these numeric text strings may be alphanumeric and may also be unique. Categorization system 110 may remove these numeric text strings from the sequence of text to aid in categorizing the sequence.

At 320, categorization system 110 may analyze the sequence of text to identify first text data from the sequence of text matching second text data from a second document file. As explained with reference to text analysis service 125, categorization system 110 may apply a crowd learning process to identify matching text. For example, categorization system 110 may analyze text data from the sequence and compare the text data to one or more other documents. Based on this comparison, categorization system 110 may identify matching text data used in other documents. In some embodiments, categorization system 110 may include a threshold for determining a number of other matching documents. If a number of matches exceeds this threshold, categorization system 110 may identify the text data as being generic and may remove this text data from the sequence of text.

In some embodiments, categorization system 110 may include a dictionary of words not to remove. For example, identifying words such as "transfer" or "checking" may be relevant to preserving for categorization. Although these may appear in other documents, these words may not be removed by categorization system 110.

At 325, categorization system 110 may remove the one or more numeric text strings and the first text data from the sequence to generate a trimmed version of the sequence of text. As explained with reference to text analysis service 125, the trimmed version of the sequence of text may remove words that are too unique and/or too generic to be useful for categorizing the sequence of text. In an embodiment related to transaction descriptions, this may include reference identification numbers, account numbers, company names, and/or other words. Removing these words may help to increase the accuracy of the category determined by the deep learning model.

In some embodiments, categorization system 110 may execute the removal of the one or more numeric text strings prior to identifying first test data that matches second text data from another document file. In this case, categorization system 110 may reduce the amount of text data to compare when identifying matching text data. This may provide increased speed and/or performance for performing the matching process. In some embodiments, categorization system 110 may execute 325 after executing 315 and 320. This process may provide more completeness because the numeric strings may also be compared to the other documents to determine if any matches exist.

At 330, categorization system 110 may apply a vectorization model to the trimmed version of the sequence to generate a vector version of the trimmed version of the sequence. As explained with reference to vectorization service 135, categorization system 110 may apply a word2vec model to the sequence. In some embodiments, the vectorization model may have been trained been trained with the deep learning model to generate vectors usable by the deep learning model. At 330, applying the vectorization model to the trimmed version of the sequence may help to increase the deep learning model's resilience to misspellings and/or errors in the remaining text data of the sequence.

At 335, categorization system 110 may apply the deep learning model to the vector version to categorize the sequence of text into a category from the predefined categories. As explained with reference to categorization service 145, the deep learning model may be a long short-term memory (LSTM) model. Based on the training at 305, the deep learning model may analyze the vector corresponding to the remaining text data of the sequence and identify a category that best matches the vector. This category may then be assigned to the text sequence and/or packaged with the text sequence. Examples of these categorizations were described with reference to FIGS. 2B and 2C. Categorization system 110 may then pass or transmit these categorizations and/or text sequences to a downstream processing system 130 for further processing.

While method 300 has been described with reference to a sequence of text from the one or more sequences of text, categorization system 110 may apply method 300 to a plurality of sequences of text. For example, categorization system 110 may apply method 300 to multiple transaction descriptions in a document 140. Categorization system 110 may analyze the plurality of sequences to identify third text data from the plurality matching fourth text data from a second document file. In response to this analysis, categorization system 110 may remove the third text data from the plurality to generate a trimmed version of the plurality of sequences. Categorization system 110 may similarly identify and/or remove numeric strings as well when generating the trimmed version. Categorization system 110 may then apply a vectorization model to the trimmed version of the plurality of sequences to generate a vector version of the plurality of sequences. Categorization system 110 may then apply the deep learning model to the vector version of the plurality of sequences to categorize each sequence from the plurality of sequences.

Experimental Measurement Results

Using the embodiments described herein may yield increased accuracy in correctly identifying a category for a particular sequence of text. This categorization may be particularly applicable to categorizing commercial bank statements. For example, categorization system 110 may identify risk categories, cash flow categories, and/or other granular categories. The risk categories may include non-sufficient funds (NSF), loans, non-traditional lender (NTL) loans, check return, personnel spend, and/or chargeback. The cash flow categories may include checks, transfers, purchase, deposits, business spend, withdrawal, and/or settlements. Granular categories may include marketing, shipping/fax/printing, sale, and/or overdraft protection.

With such categories, the inventors have tested categorization system 110 against related categorization systems. These tests included applying the different models to different bank statements and determining whether the models accurately categorized each sequence of text corresponding to different transactions. Categorization system 110 more accurately categorized sequences of text relative to these other models and systems as shown in the table below:

|  | Categorization system 110 | URS ® Model | Yodlee ® Model |
| --- | --- | --- | --- |
| Number of Categories | 44 | 29 | 93 |
| Number of Risk Related Categories | 7 | 5 | 3 |
| Number of Cash Flow Related Categories | 12 | 3 | 10 |
| Accuracy for a Transaction Categorization | 91% | 81.3% | 67.8% |

-continued

|                         | Categorization system 110 | URS ® Model | Yodlee ® Model |
|-------------------------|---------------------------|-------------|----------------|
| Accuracy in Dollar Levels | $ 92%                   | $ 67.9%     | $ 67.6%        |

In this manner, the experimental measurement results have demonstrated that categorization system 110 has provided more accurate text categorizations relative to other modeling systems. This increased accuracy may yield more accurate analytics for downstream processing systems 130.

Figure 4:
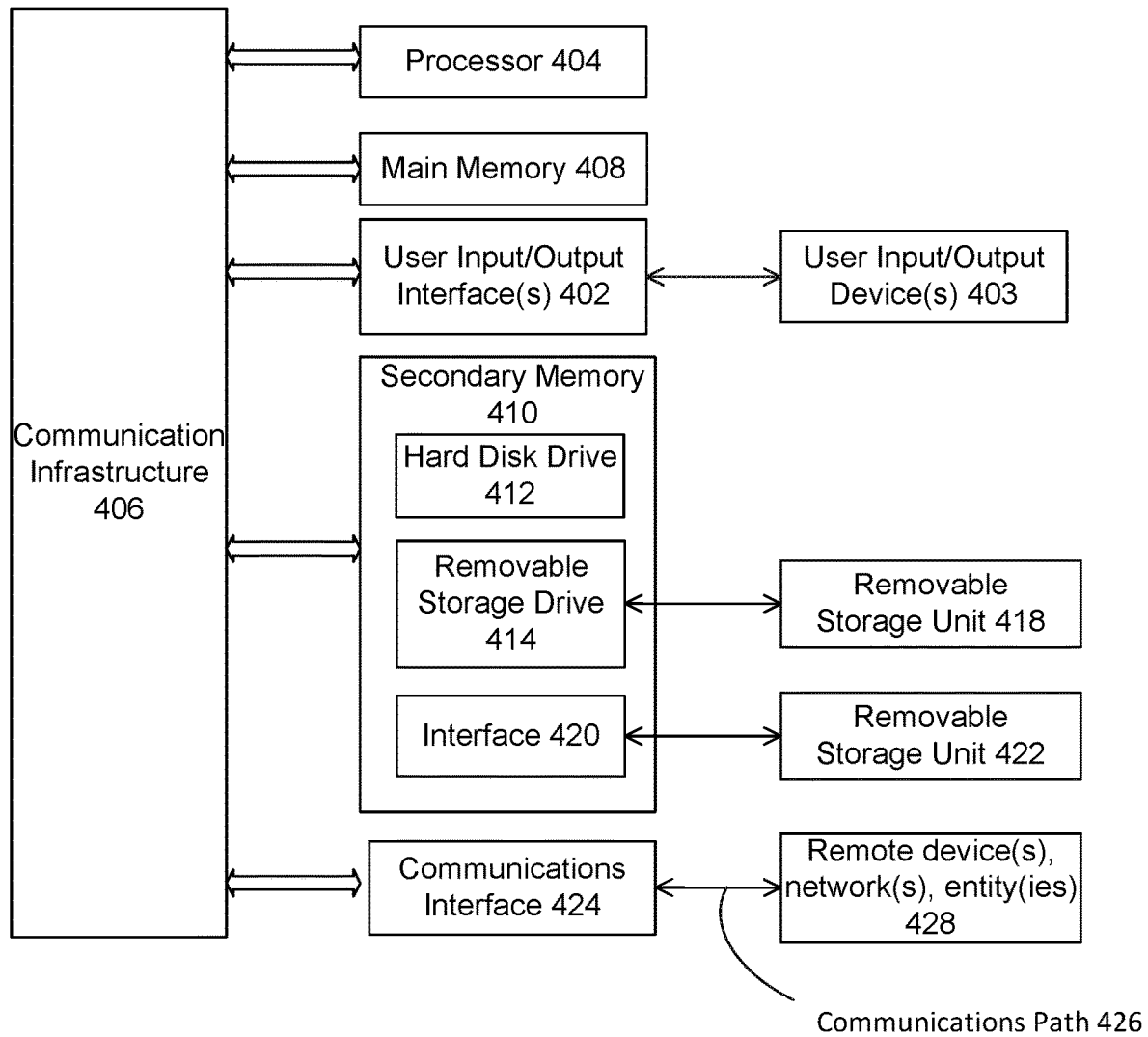
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for categorizing text data, comprising:
   receiving a first document file in a machine-readable format, wherein the first document file includes one or more sequences of text;
   analyzing a sequence of text from the one or more sequences to identify a numeric text string in the sequence of text that forms an alphanumeric reference;
   generating a trimmed version of the sequence of text by:
      removing first text data from the sequence of text based on an amount of matches between the first text data and respective text data for a plurality of document files satisfying a match threshold, and
      removing the numeric text string from the sequence of text to transform the alphanumeric reference to second text data;
   generating, based on the trimmed version of the sequence of text put into a vectorization model, a vector version of the trimmed version of the sequence of text; and
   generating, based on the vector version put into a deep learning model, a categorization of the sequence of text, wherein the deep learning model is pre-trained to categorize vector representations of the text data into predefined categories based on language pattern dependencies indicated by states of cells of the vector version that correspond to each portion of another sequence of text that is managed by a respective neural network of a plurality of neural networks of the deep learning model, wherein the language pattern dependencies correspond to a first language that is different from a second language indicated by the trimmed version of the sequence of text.

2. The computer-implemented method of claim 1, wherein the first document file is a commercial bank statement.

3. The computer-implemented method of claim 2, wherein the sequence of text is a row of transaction description text from the commercial bank statement.

4. The computer-implemented method of claim 1, wherein analyzing the sequence of text further comprises:
   applying a crowd learning algorithm to compare the first text data to text data from the plurality of document files including a second document file.

5. The computer-implemented method of claim 1, wherein the generating the vector version of the trimmed version of the sequence is further based on:
   a word2vec algorithm.

6. The computer-implemented method of claim 1, wherein the deep learning model is a long short-term memory (LSTM) model.

7. The computer-implemented method of claim 4, wherein the first document file includes a plurality of sequences of text, the method further comprising:
   analyzing the plurality of sequences to identify third text data matching fourth text data from the second document file;
   in response to analyzing the plurality of sequences to identify the third text data matching the fourth text data, removing the third text data from the plurality of sequences to generate a trimmed version of the plurality of sequences;
   applying the vectorization model to the trimmed version of the plurality of sequences to generate a vector version of the plurality of sequences; and
   applying the deep learning model to the vector version of the plurality of sequences to categorize each sequence from the plurality of sequences.

8. A system for categorizing text data, comprising:
   a memory; and
   at least one processor coupled to the memory and configured to:
   receive a first document file in a machine-readable format, wherein the first document file includes one or more sequences of text;

analyze a sequence of text from the one or more sequences to identify a numeric text string in the sequence of text that forms an alphanumeric reference;

generate a trimmed version of the sequence of text by:
removing first text data from the sequence of text based on an amount of matches between the first text data and respective text data for a plurality of document files satisfying a match threshold, and
removing one or more numeric text strings from the sequence of text;

generate, based on the trimmed version of the sequence of text put into a vectorization model, a vector version of the trimmed version of the sequence of text; and generating, based on the vector version put into a deep learning model, a categorization of the sequence of text, wherein the deep learning model is pre-trained to categorize vector representations of the text data into predefined categories based on language pattern dependencies indicated by states of cells of the vector version that correspond to each portion of another sequence of text that is managed by a respective neural network of a plurality of neural networks of the deep learning model, wherein the language pattern dependencies correspond to a first language that is different from a second language indicated by the trimmed version of the sequence of text.

9. The system of claim 8, wherein the first document file is a commercial bank statement.

10. The system of claim 9, wherein the sequence of text is a row of transaction description text from the commercial bank statement.

11. The system of claim 8, wherein to analyze the sequence of text, the at least one processor is further configured to:
apply a crowd learning algorithm to compare the first text data to text data from the plurality of document files including a second document file.

12. The system of claim 8, wherein to generate the vector version of the trimmed version of the sequence the at least one processor is further configured to:
execute a word2vec algorithm.

13. The system of claim 8, wherein the deep learning model is a long short-term memory (LSTM) model.

14. The system of claim 11, wherein the first document file includes a plurality of sequences of text and wherein the at least one processor is further configured to:
analyze the plurality of sequences to identify third text data matching fourth text data from the second document file;
in response to analyzing the plurality of sequences to identify the third text data matching the fourth text data, remove the third text data from the plurality of sequences to generate a trimmed version of the plurality of sequences;
apply the vectorization model to the trimmed version of the plurality of sequences to generate a vector version of the plurality of sequences; and apply the deep learning model to the vector version of the plurality of sequences to categorize each sequence from the plurality of sequences.

15. A non-transitory computer-readable device having instructions stored thereon that, when executed by at least one computing device, cause the at least one computing device to perform operations comprising:
receiving a first document file in a machine-readable format, wherein the first document file includes one or more sequences of text;
analyzing a sequence of text from the one or more sequences to identify a numeric text string in the sequence of text that forms an alphanumeric reference;
generating a trimmed version of the sequence of text by:
removing first text data from the sequence of text based on an amount of matches between the first text data and respective text data for a plurality of document files satisfying a match threshold, and
removing one or more numeric text strings from the sequence of text;
generating, based on the trimmed version of the sequence put into a vectorization model, a vector version of the trimmed version of the sequence of text; and
generating, based on the vector version put into a deep learning model, a categorization of the sequence of text, wherein the deep learning model is pre-trained to categorize vector representations of text data into predefined categories based on language pattern dependencies indicated by states of cells of the vector version that correspond to each portion of another sequence of text that is managed by a respective neural network of a plurality of neural networks of the deep learning model, wherein the language pattern dependencies correspond to a first language that is different from a second language indicated by the trimmed version of the sequence of text.

16. The non-transitory computer-readable device of claim 15, wherein the first document file is a commercial bank statement and wherein the sequence of text is a row of transaction description text from the commercial bank statement.

17. The non-transitory computer-readable device of claim 15, wherein to analyze the sequence of text, the operations further comprise:
applying a crowd learning algorithm to compare the first text data to text data from the plurality of document files including a second document file.

18. The non-transitory computer-readable device of claim 15, wherein the deep learning model is a long short-term memory (LSTM) model and wherein the generating the vector version of the trimmed version of the sequence is further based on
a word2vec algorithm.

* * * * *